(12) United States Patent
Wu

(10) Patent No.: US 9,759,248 B1
(45) Date of Patent: Sep. 12, 2017

(54) CHAIR WITH PLUG TYPE CONNECTION STRUCTURE

(71) Applicant: Hui Wu, Linhai (CN)

(72) Inventor: Hui Wu, Linhai (CN)

(73) Assignee: YOTRIO GROUP CO., LTD., Linhai, Zhejiang (CN)

( * ) Notice: Subject to any disclaimer, the term of this patent is extended or adjusted under 35 U.S.C. 154(b) by 0 days.

(21) Appl. No.: 15/177,736

(22) Filed: Jun. 9, 2016

(30) Foreign Application Priority Data

Mar. 11, 2016 (CN) .................... 2016 2 0190064 U

(51) Int. Cl.
*A47C 7/02* (2006.01)
*A47C 1/12* (2006.01)
*F16B 12/10* (2006.01)
*A47C 5/04* (2006.01)
*A47C 7/16* (2006.01)
*A47C 7/40* (2006.01)

(52) U.S. Cl.
CPC ............. *F16B 12/10* (2013.01); *A47C 5/04* (2013.01); *A47C 7/16* (2013.01); *A47C 7/40* (2013.01)

(58) Field of Classification Search
CPC ... F16B 12/10; A47C 5/04; A47C 7/16; A47C 7/40
USPC ......... 297/445.1, 446.1, 446.2, 447.3, 449.1, 297/450.1, 452.63
See application file for complete search history.

(56) References Cited

U.S. PATENT DOCUMENTS

| 1,721,601 | A | * | 7/1929 | McClure | A47C 11/00 297/446.1 |
|---|---|---|---|---|---|
| 2,580,707 | A | * | 1/1952 | Underhill | A47C 4/02 297/445.1 |
| 2,709,485 | A | * | 5/1955 | Haven | A47C 4/02 297/446.1 |
| 3,275,375 | A | * | 9/1966 | Moore | A47C 7/185 297/445.1 X |
| 3,464,479 | A | * | 9/1969 | Baker | A47C 5/06 297/452.63 |
| 3,533,585 | A | * | 10/1970 | Hollermann | A47B 91/08 297/450.1 X |
| 3,971,587 | A | * | 7/1976 | Curtis | A47C 5/12 297/445.1 |
| 4,436,342 | A | * | 3/1984 | Nilson | F16B 12/20 297/446.1 X |
| 5,337,471 | A | * | 8/1994 | Graney | A47C 3/00 297/446.1 X |
| 5,836,655 | A | * | 11/1998 | Laufer | A47C 31/04 297/452.63 X |
| 5,924,771 | A | * | 7/1999 | Marchesi | B60N 2/242 297/452.63 X |
| 6,036,273 | A | * | 3/2000 | Lin | A47C 5/06 297/452.63 |
| 6,139,110 | A | * | 10/2000 | Jeng | A47C 11/00 297/445.1 |
| 7,226,130 | B2 | * | 6/2007 | Tubergen | A47C 7/28 297/452.63 X |

(Continued)

*Primary Examiner* — Rodney B White
(74) *Attorney, Agent, or Firm* — James Cai; SAC Attorneys LLP

(57) ABSTRACT

A chair comprises: two side frames, each of the two side frames comprising a front supporting leg and a rear supporting leg; a seat portion fixed between the two side frames; and a backrest portion connected to the rear supporting legs of the two side frames via a plug structure.

16 Claims, 6 Drawing Sheets

(56) References Cited

U.S. PATENT DOCUMENTS

| | | | | |
|---|---|---|---|---|
| 7,568,769 B1* | 8/2009 | Chuang | ............... | A47C 7/024 297/452.63 X |
| 7,730,594 B2* | 6/2010 | Hsiao | ............... | A47C 31/00 297/452.63 X |
| 8,087,730 B2* | 1/2012 | Leng | ............... | A47C 7/42 297/450.1 X |
| 8,511,753 B2* | 8/2013 | Huang | ............... | A47C 3/00 297/446.1 X |
| 8,550,565 B2* | 10/2013 | Caldwell | ............... | A47C 31/023 297/452.63 X |
| 2004/0084951 A1* | 5/2004 | Pawlush | ............... | A47C 11/00 297/452.63 |
| 2013/0175844 A1* | 7/2013 | Noe | ............... | A47C 7/02 297/445.1 |
| 2014/0152069 A1* | 6/2014 | Codina | ............... | A47C 3/00 297/446.1 X |

* cited by examiner

CHAIR WITH PLUG TYPE CONNECTION STRUCTURE

CROSS-REFERENCE TO RELATED APPLICATIONS

The present application claims priority of patent application (Application No. 201620190064.7) filed with the State Intellectual Property Office of The People's Republic of China on Mar. 11, 2016.

TECHNICAL FIELD

Aspects of the present invention relate to furniture, and more particularly to a chair.

BACKGROUND

Generally a chair has a backrest portion and is also referred as a backrest chair. A chair generally comprises two side frames, a seat portion fixed between the two side frames and a backrest portion disposed between the two side frames and above the seat portion. In the prior art, the backrest portion of the chair is fixed to the two side frames by welding or utilizing fasteners. With this fixing method, welding or utilizing fasteners will make the assembling operations complicated and inconvenient. In addition, the welding seams or the fasteners are exposed to the outside and thus can be observed from behind, which adversely affects the appearance of the chair.

The above information disclosed in this Background section is only for enhancement of understanding of the background of the disclosure and therefore may contain information that does not form the prior art that is already known in this country to a person of ordinary skill in the art.

SUMMARY

Embodiments of the present invention are directed to a chair having simple and convenient assembling operations as well as good appearance.

According to embodiments of the present invention, a chair comprises: two side frames, each of the two side frames comprising a front supporting leg and a rear supporting leg; a seat portion fixed between the two side frames; and a backrest portion connected to the rear supporting legs of the two side frames via a plug structure.

The plug structure may comprise: two grooves formed at front surfaces of the rear supporting legs respectively, each of the two grooves having an opening facing the front supporting legs and extending in a substantial vertical direction; and a plurality of fasteners mounted on a rear surface of the backrest portion, each of the plurality of fasteners having a head received in one of the two grooves.

The fasteners may comprise bolts or screws. Each of the two grooves may have a shape of substantial hollow cuboid.

The backrest portion may comprise a plurality of back plates extending between the rear supporting legs, and each of the back plates may have the fasteners mounted thereon. A plurality of back plate spacers may be disposed between adjacent back plates. Each of the plurality of back plate spacers may have a shape of substantial cuboid with two slots formed in two side surfaces of the back plate spacer respectively. The plurality of back plates may be made of aluminum alloy.

Each of the rear supporting legs may have an upper part and a lower part, and the grooves may be formed on the upper parts of the rear supporting legs. The upper parts may be inclined backward.

Alternatively, the plug structure may comprise two grooves formed at front surfaces of the rear supporting legs respectively, each of the two grooves having an opening extending in a substantial vertical direction and the two openings facing each other.

Each of the two grooves may have a shape of substantial hollow cuboid.

The backrest portion may comprise a plurality of back plates extending between the rear supporting legs. A plurality of back plate spacers may be disposed between adjacent back plates. Each of the plurality of back plate spacers may have a shape of substantial cuboid with two slots formed in two side surfaces of the back plate spacer respectively. The plurality of back plates may be made of aluminum alloy.

Each of the rear supporting legs may have an upper part and a lower part, and the grooves may be formed on the upper parts of the rear supporting legs. The upper parts may be inclined backward.

Each of the grooves may have a depth which is equal to a thickness of the backrest portion.

The chair may further comprise two arms assembled between the front supporting legs and the rear supporting legs respectively.

With the plug structure according to embodiments of the present invention, there is no need to perform welding processing nor fastener connection processing. Rather, the backrest portion can be easily inserted into the rear supporting legs with the plug structure. Therefore, the assembling operations are simple and convenient.

Furthermore, the grooves are formed at the front surfaces of the rear supporting legs which face the front supporting legs. Thus the plug structure will not be observed from behind, which brings much better appearance compared with the prior art.

In addition, the backrest portion may comprise a plurality of back plates and adjacent back plates may be separated by back plate spacers. In this way, it is easy to assemble the back plates to the rear supporting legs. And since each back plate has a relatively small height, even if the upper parts of the rear supporting legs have a curved shape, the backrest portion can be assembled easily. Meanwhile, a plurality of back plates with gap therebetween can bring ventilation function and thus good comfort to users of the chair.

BRIEF DESCRIPTION OF DRAWINGS

These and/or other aspects of the present invention will become apparent and more readily appreciated from the following description of the embodiments, taken in conjunction with the accompanying drawings in which.

DETAILED DESCRIPTION

Figure 1:
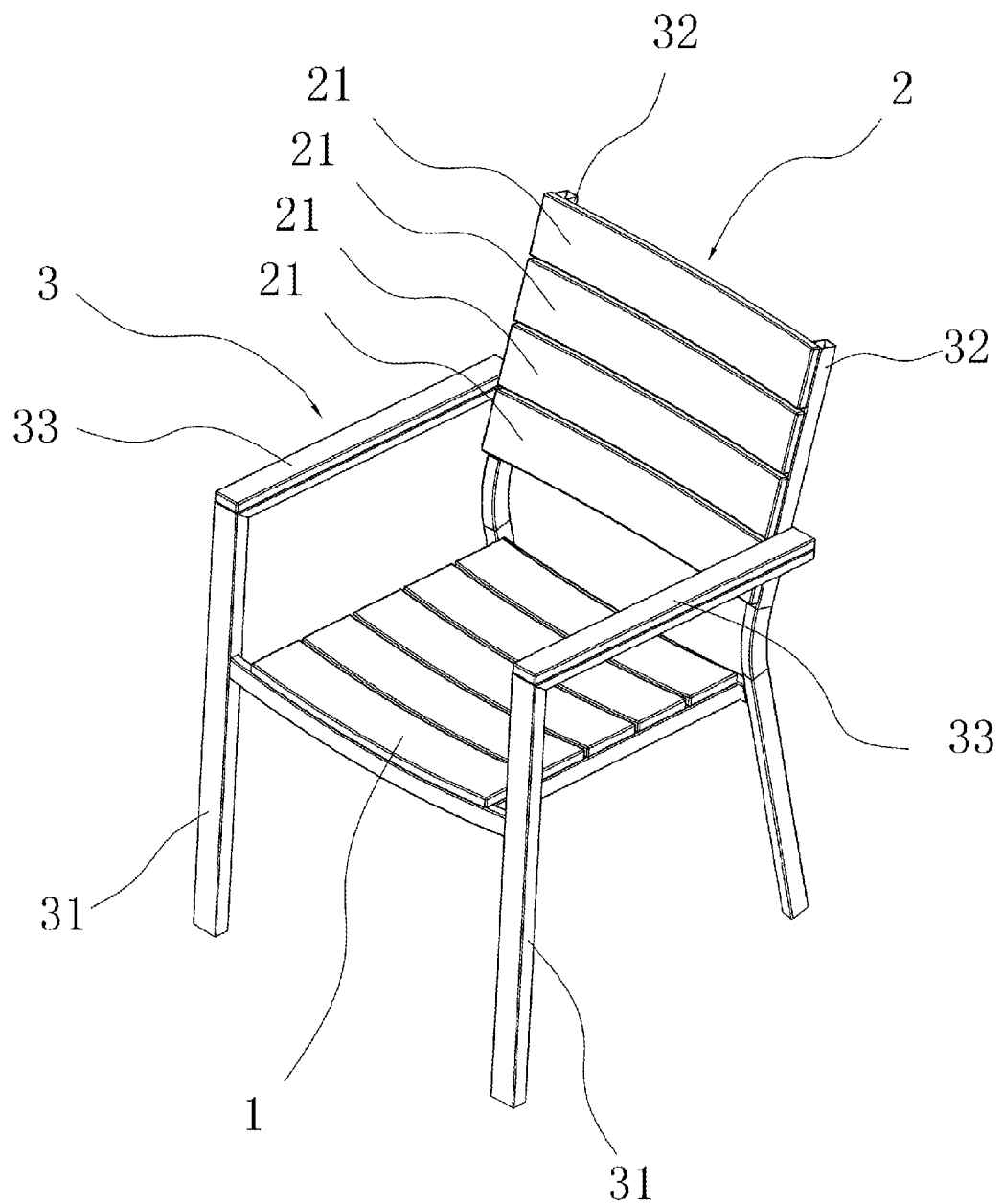
FIG. 1 is a schematic view illustrating a chair according to an exemplary embodiment of the present invention.

Reference will now be made in detail to embodiments, examples of which are illustrated in the accompanying drawings, wherein same reference numerals refer to same or similar elements throughout. In this regard, the present embodiments may have different forms and should not be construed as being limited to the descriptions set forth herein. Accordingly, the embodiments are merely described below, by referring to the figures, to explain aspects of the present description.

Hereinafter a chair according to an exemplary embodiment of the present invention will be described in detail with reference to FIGS. 1-5.

FIG. 1 is a schematic view illustrating a chair according to an exemplary embodiment of the present invention.

As shown in FIG. 1, a chair according to an exemplary embodiment of the present invention comprises a seat portion 1, a backrest portion 2 and two side frames 3. The seat portion 1 is fixed between the two side frames 3, and may include a plurality of plates extending in a direction between the two side frames 3. Each of the side frames 3 comprises a front supporting leg 31 and a rear supporting leg 32. The backrest portion 2 is connected to the two rear supporting legs 32 via a plug structure.

The plug structure will be described in detail referring to FIGS. 2-5 as well as FIG. 1.

Figure 2:
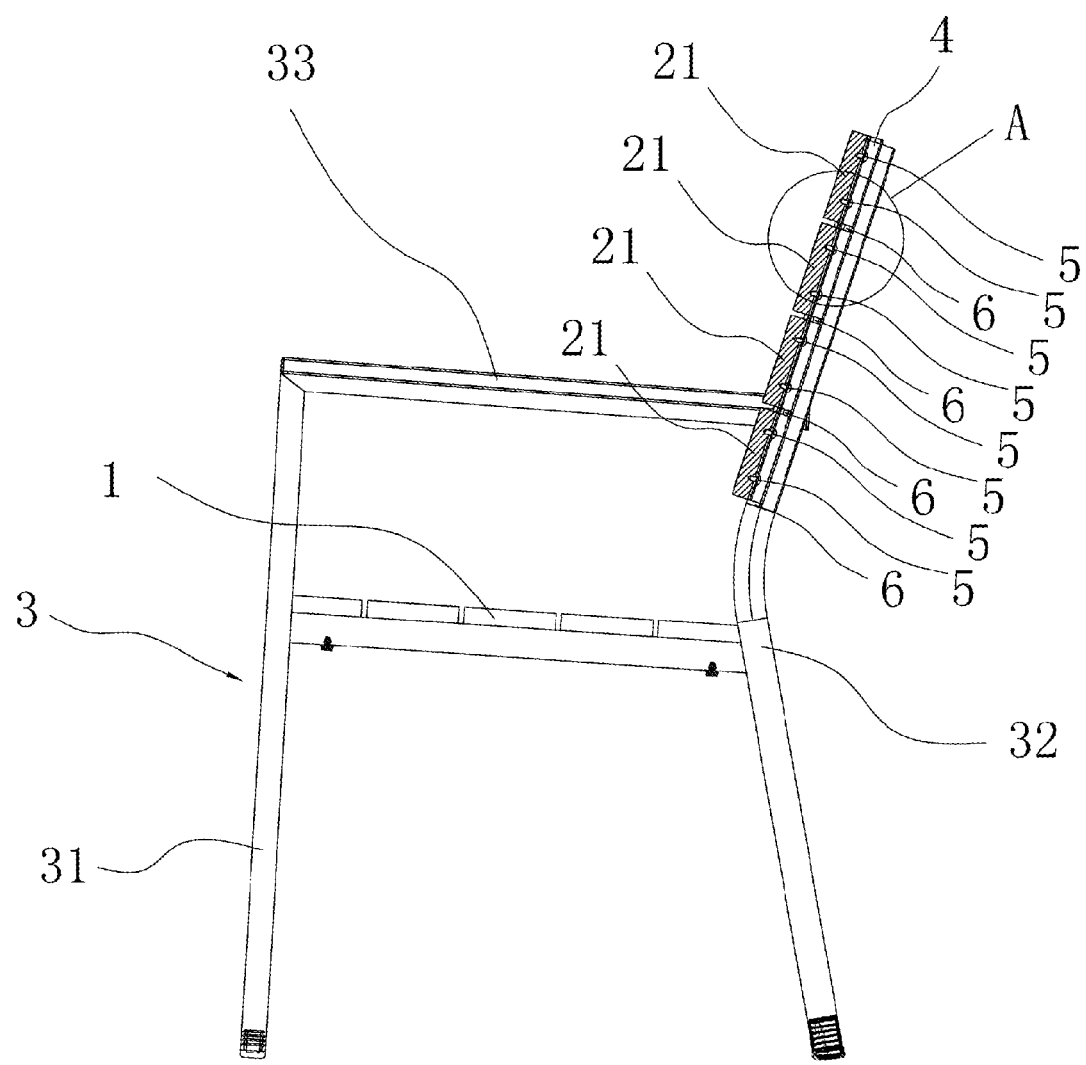
FIG. 2 is a partial cross-sectional view illustrating a side of the chair shown in FIG. 1.
Figure 3:
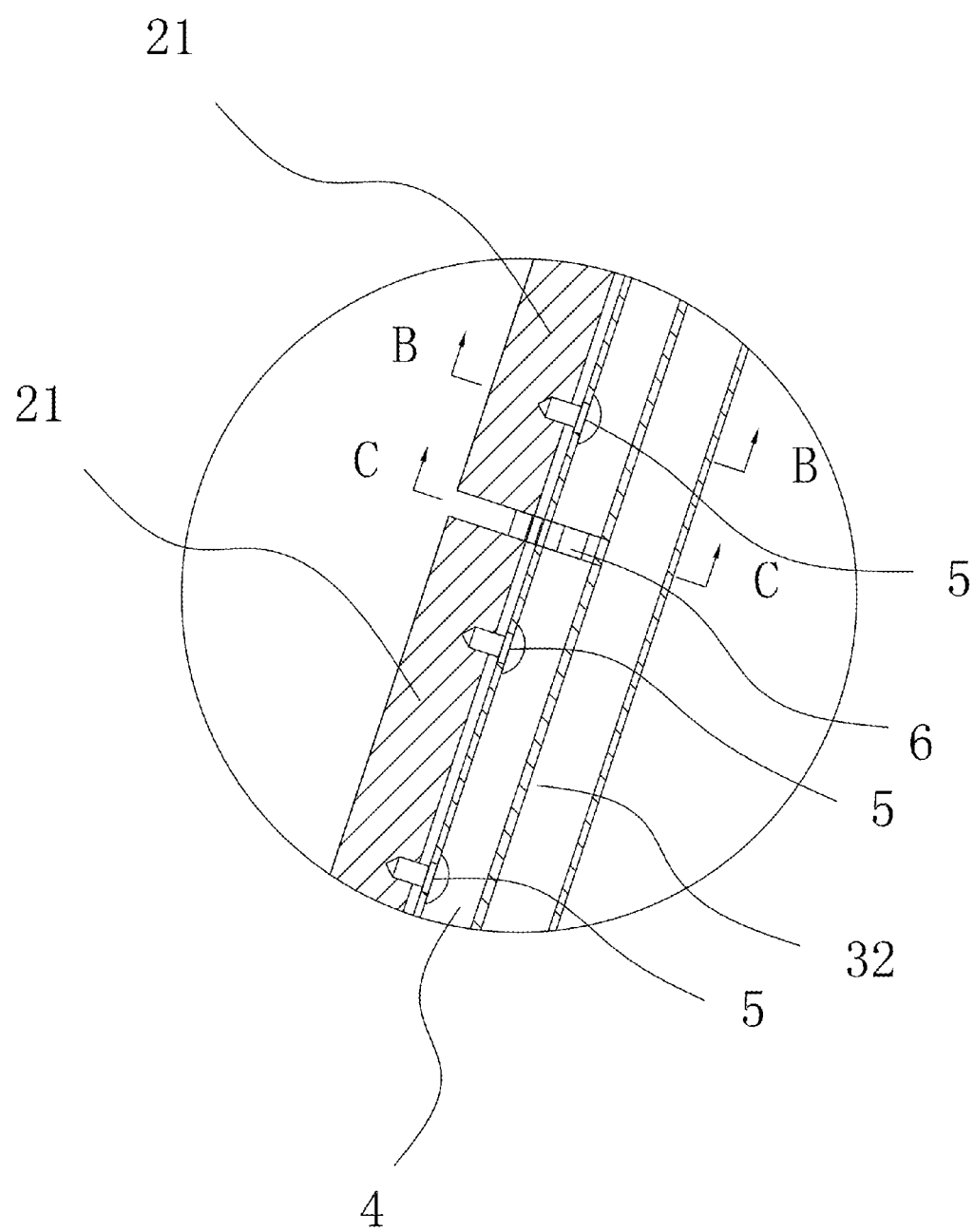
FIG. 3 is an enlarged view of portion A of FIG. 2.
Figure 4:
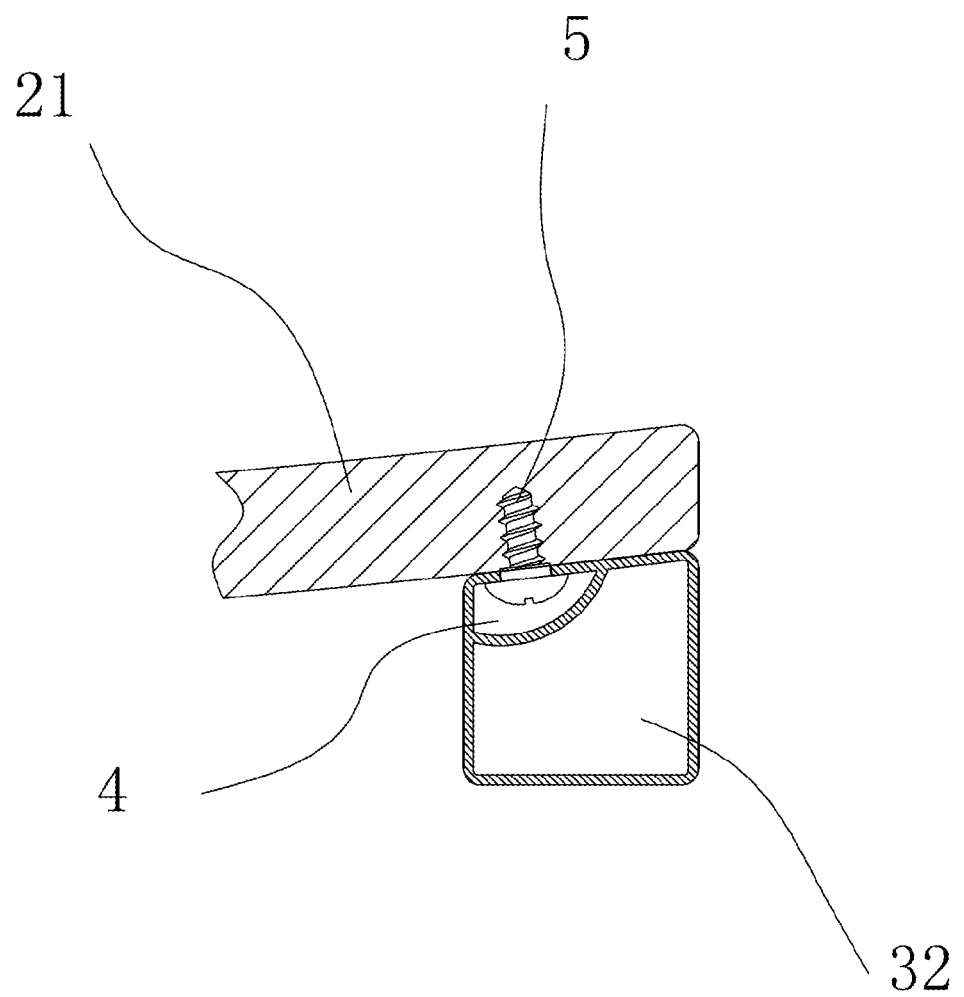
FIG. 4 is a schematic cross-sectional view of FIG. 3 taken along line B-B.

FIG. 2 is a partial cross-sectional view illustrating a side of the chair shown in FIG. 1; FIG. 3 is an enlarged view of portion A of FIG. 2; FIG. 4 is a schematic cross-sectional view of FIG. 3 taken along line B-B; and FIG. 5 is a schematic cross-sectional view of FIG. 3 taken along line C-C.

As shown in FIGS. 2-5 as well as FIG. 1, each of the rear supporting legs 32 has an upper part and a lower part which are connected through an arc. A top end of the lower part of each of the rear supporting legs 32 is more adjacent to the front supporting legs 31 than a bottom end thereof, while a top end of the upper part of each of the rear supporting legs 32 is more far away from the front supporting legs 31 than a bottom end thereof. In other words, the lower part of each of the rear supporting legs 32 is inclined forward, while the upper part of each of the rear supporting legs 32 is inclined backward.

Figure 5:
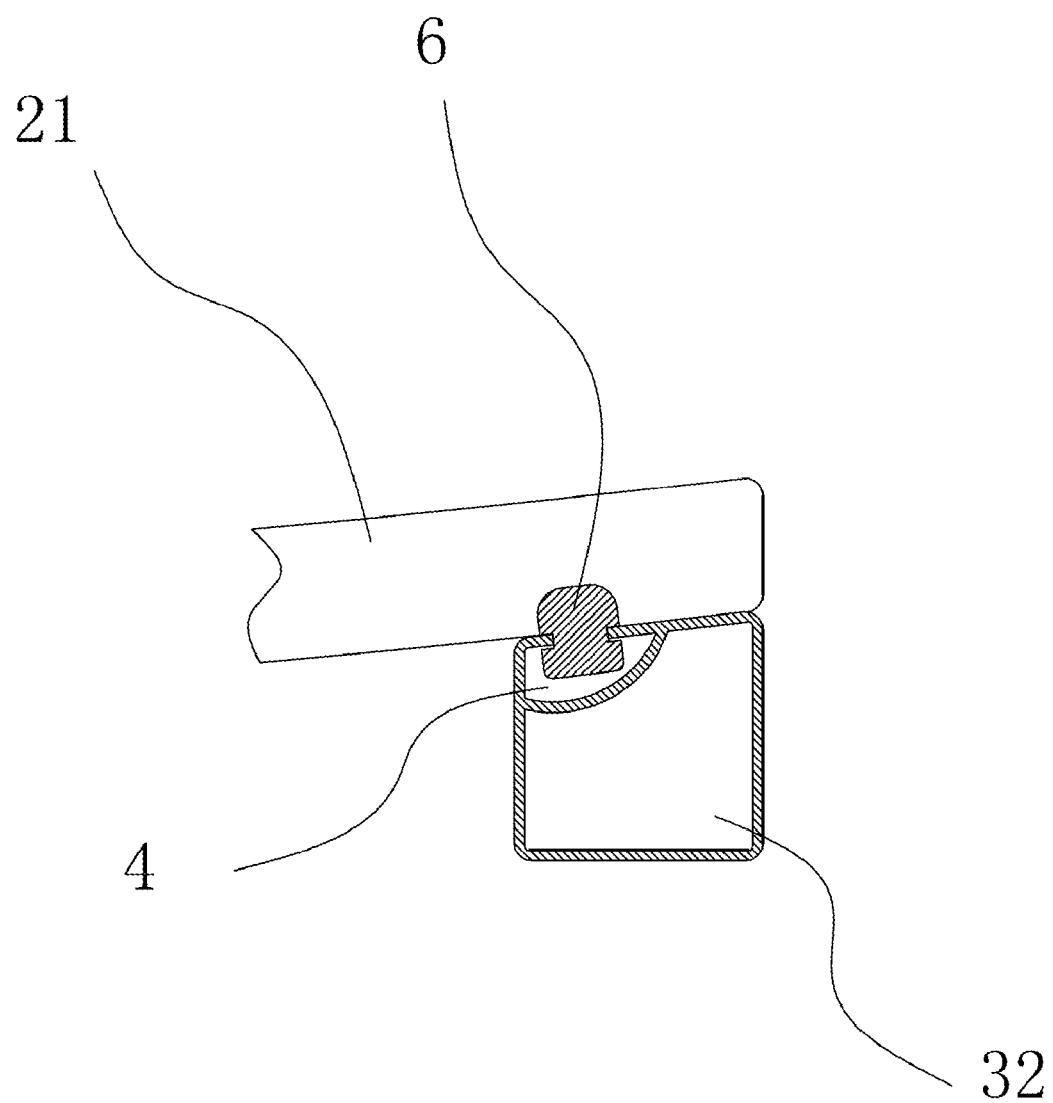
FIG. 5 is a schematic cross-sectional view of FIG. 3 taken along line C-C.

Particularly referring to FIGS. 4 and 5, the upper part of each of the rear supporting legs 32 has a shape of substantial hollow cuboid extending in a substantial vertical direction.

Referring to FIGS. 2-5, the upper part of each of the rear supporting legs 32 has a groove 4 formed at a front surface thereof, i.e., a surface facing the front supporting legs 31. The grooves 4 may be formed integrally with the rear supporting legs 32, but this invention is not limited thereto. An opening of each of the grooves 4 faces the front supporting legs 31. Both of the grooves 4 and the openings of the grooves 4 extend in the substantial vertical direction.

Referring to FIGS. 1-3, the backrest portion 2 includes a plurality of back plates 21 extending between the two rear supporting legs 32, i.e. in the substantial horizontal direction. There is a gap between adjacent back plates 21 in the substantial vertical direction, so as to bring ventilation function and thus good comfort to users of the chair. Each of the back plates 21 has a shape of substantial cuboid, two ends of the back plate 21 in the longitude direction are connected to the rear supporting legs 32 respectively.

In detail, referring to FIGS. 2-4, fasteners 5 such as bolts or screws are mounted on both ends of a rear surface of each of the back plates 21 in the substantial horizontal direction. That is, the positions of the fasteners 5 in the substantial horizontal direction correspond to the positions of the grooves 4 in the substantial horizontal direction. The number of the fasteners 5 may be two or four for one back plate 21, but this invention is not limited thereto. The fasteners 5 are shaped that the heads thereof can be received and slide in the grooves 4 via the openings of the grooves 4, as shown in FIG. 4, while the tails thereof are mounted inside the back plates 21.

As shown in FIGS. 2, 3 and 5, a plurality of back plate spacers 6 are disposed along the grooves 4. As shown in FIG. 5, each of the back plate spacers 6 has a shape of substantial cuboid with two slots formed in its two side surfaces respectively, so that the back plate spacers 6 can engage with the openings of the grooves 4 and thus can slide along the grooves 4 without being separated from the grooves 4.

Furthermore, the back plates 21 can be formed as woodlike plates and be made of metal such as aluminum alloy.

Hereinafter a method for assembling the backrest portion 2 to the rear supporting legs 32 will be described.

Firstly, two back plate spacers 6 are inserted into the openings of the two grooves 4 respectively, and are slid along a direction from the top end to the bottom end of the upper parts of the rear supporting legs 32, until the back plate spacers 6 are leaned against the bottom ends of the grooves 4 which are enclosed to support the back plate spacers 6.

Secondly, the heads of the fasteners 5 on the rear surface of one back plate 21 are inserted into the grooves 4, as shown in FIG. 4, and are slid in the direction from the top end to the bottom end of the upper parts of the rear supporting legs 32, until the back plate 21 is leaned against the back plate spacers 6, i.e., a bottom surface of the back plate 21 firmly contacts top surfaces of the back plate spacers 6.

Next, like the first step, two back plate spacers 6 are inserted into the openings of the two grooves 4 respectively, and are slid along a direction from the top end to the bottom end of the upper parts of the rear supporting legs 32, until the back plate spacers 6 are leaned against a top surface of the back plate 21 located therebelow.

Then, like the second step, the heads of the fasteners 5 on the rear surface of another back plate 21 are inserted into the grooves 4, and are slid in the direction from the top end to the bottom end of the upper parts of the rear supporting legs 32, until the back plate 21 is leaned against the back plate spacers 6 therebelow, i.e., a bottom surface of the back plate 21 firmly contacts top surfaces of the back plate spacers 6.

The third and fourth steps are repeated until all of the back plates 21 are assembled to the rear supporting legs 32.

It could be understood that the above-described method is just an example, and this invention is not limited thereto. For example, the first step may be omitted. In this case, the lowest back plate 21 is directly leaned against the bottom ends of the grooves 4 which are enclosed.

In this embodiment, the fasteners 5 mounted on the back plates 21 and the grooves 4 formed in the rear supporting legs 32 form a plug structure for assembling the backrest portion 2 to the rear supporting legs 32. With this plug structure, there is no need to perform welding processing nor fastener connection processing. Rather, the back plates 21 of the backrest portion 2 can be inserted into the rear supporting legs 32 with the plug structure according to this embodiment. Therefore, the assembling operations are simple and convenient.

Furthermore, the grooves 4 are formed at the front surfaces of the rear supporting legs 32 which face the front supporting legs 31, and the heads of the fasteners 5 mounted on the rear surfaces of the back plates 21 are received inside the grooves 4. Thus the connection structure, i.e., the plug structure including the fasteners 5 and the grooves 4, will not be observed from behind, i.e., from the back side of the chair, which brings much better appearance compared with the prior art.

In this embodiment, the backrest portion 2 comprises a plurality of back plates 21 and adjacent back plates 21 are separated by back plate spacers 6. In this way, it is easy to assemble the back plates 21 to the rear supporting legs 32. And since each back plate 21 has a relatively small height, even if the upper part of the rear supporting legs 32 has a curved shape, the backrest portion 2 can be assembled easily. Meanwhile, a plurality of back plates 21 with gap therebetween can bring the ventilation function and thus good comfort to users of the chair.

It could be understood that the above description is just an example and this invention is not limited thereto. For example, the backrest portion 2 may be formed of a whole plate, without being divided into a plurality of back plates 21. In addition, two arms 3 may be further assembled between the front supporting legs 31 and the rear supporting legs 32 to improve both functionality and stability of the chair, as shown in FIG. 1.

Hereinafter a chair according to another exemplary embodiment of the present invention will be described in detail with reference to FIG. 6. The chair according to this embodiment is similar to that according to the embodiment shown in FIGS. 1-5 and repeated description may be omitted in order to avoid redundancy.

Figure 6:
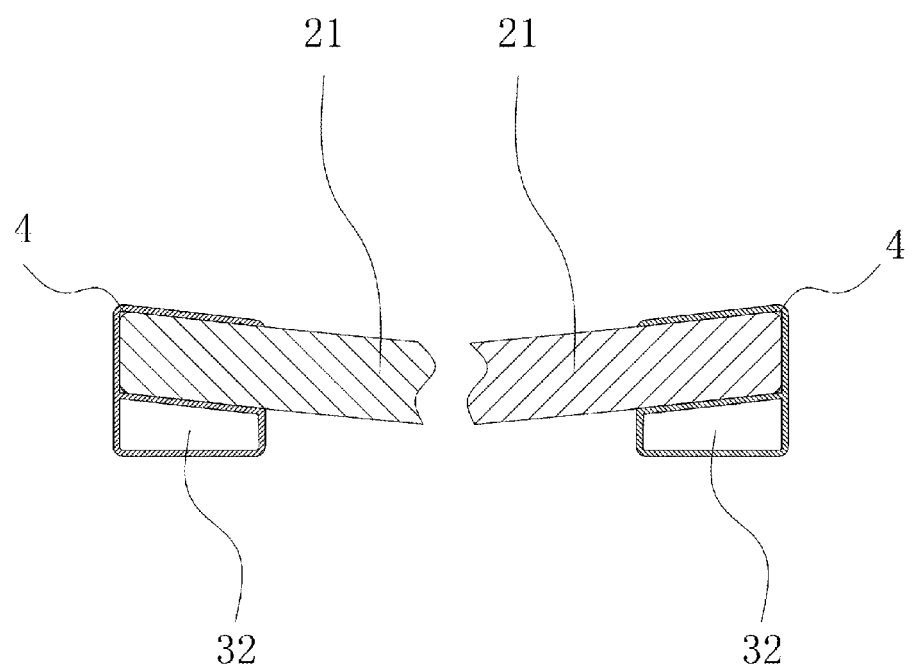
FIG. 6 is a schematic cross-sectional view illustrating a plug structure for connecting a backrest portion and two rear supporting legs of a chair according to another exemplary embodiment of the present invention.

FIG. 6 is a schematic cross-sectional view illustrating a plug structure for connecting a backrest portion and two rear supporting legs of a chair according to another exemplary embodiment of the present invention.

Like the chair according to the embodiment shown in FIGS. 1-5, two grooves 4 are formed at front surfaces of the rear supporting legs 32 respectively, each of the two grooves 4 has a shape of substantial hollow cuboid and has an opening extending in a substantial vertical direction.

The backrest portion 2 comprises a plurality of back plates 21 extending between the rear supporting legs 32. A plurality of back plate spacers 6 can be disposed between adjacent back plates 21. Each of the back plate spacers 6 has a shape of substantial cuboid with two slots formed in two side surfaces of the back plate spacer 6 respectively. The plurality of back plates 21 may be made of aluminum alloy.

In addition, each of the rear supporting legs 32 has an upper part and a lower part, and the grooves 4 are formed on the upper parts of the rear supporting legs 32. The upper parts of the rear supporting legs 32 may be inclined backward.

Different from the chair according to the embodiment shown in FIGS. 1-5 in which the openings of the grooves 4 face the front supporting legs 31, in this embodiment, as shown in FIG. 6, the openings of the two grooves 4 formed in the rear supporting legs 32 respectively face each other, i.e., the openings are formed in the longitude direction of the back plates 21. In addition, the grooves 4 each has a depth which is equal to the thickness of backrest portion 2, i.e., the back plates 21, so that the backrest portion 2 can firmly contact the grooves 4, thereby providing stable connection.

Here, both of the depth of the grooves 4 and the thickness of the backrest portion 2 are measured in the direction from the front side to the rear side of the chair.

In this embodiment, the plug structure for assembling the backrest portion 2 to the rear supporting legs 32 is formed of only grooves 4, and the fasteners 5 are not required. During assembling, the two ends of one of the back plates 21 are directly inserted into the two grooves 4 formed in the rear supporting legs 32 respectively, and thus the assembling operations are further simplified.

Furthermore, the grooves 4 are formed at the front surfaces of the rear supporting legs 32 which face the front supporting legs 31, the openings of the grooves 4 face each other, and the back plates 21 are directly inserted into the grooves 4. Thus the connection structure, i.e., the plug structure including the grooves 4, will not be observed from behind, which brings much better appearance compared with the prior art.

Example embodiments have been disclosed herein, and although specific terms are employed, they are used and are to be interpreted in a generic and descriptive sense only and not for purpose of limitation. In some instances, as would be apparent to one of ordinary skill in the art, features, characteristics, and/or elements described in connection with a particular embodiment may be used singly or in combination with features, characteristics, and/or elements described in connection with other embodiments, unless otherwise specifically indicated. Accordingly, it will be understood by those of skill in the art that various changes in form and details may be made without departing from the spirit and scope of the present invention, and as set forth in the following claims.

What is claimed is:

1. A chair, comprising:
   two side frames, each of the two side frames comprising a front supporting leg and a rear supporting leg;
   a seat portion fixed between the two side frames;
   a backrest portion connected to the rear supporting legs of the two side frames via a plug structure, wherein said plug structure comprises:
      two grooves formed at front surfaces of the rear supporting legs respectively, each of the two grooves comprising an opening facing the front supporting legs and extending in a substantial vertical direction; and
      a plurality of fasteners mounted on a rear surface of the backrest portion, each of the plurality of fasteners comprising a head received in one of the two grooves;
   said backrest portion further comprising a plurality of back plates extending between the rear supporting legs, wherein each of the back plates has the fasteners mounted thereon; and
   said backrest portion further comprising a plurality of back plate spacers between adjacent back plates.

2. The chair of claim 1, wherein each of the plurality of back plate spacers has a shape of substantial cuboid with two slots formed in two side surfaces of the back plate spacer respectively.

3. A chair, comprising:
   two side frames, each of the two side frames comprising a front supporting leg and a rear supporting leg;
   a seat portion fixed between the two side frames;
   a backrest portion connected to the rear supporting legs of the two side frames via a plug structure, wherein said plug structure comprises two grooves formed at front surfaces of the rear supporting legs respectively, wherein each of the two grooves comprise an opening extending in a substantial vertical direction, and wherein the two openings face each other;

said backrest portion further comprising a plurality of back plates extending between the rear supporting legs; and said backrest portion further comprising a plurality of back plate spacers between adjacent back plates.

4. The chair of claim 3, wherein each of the plurality of back plate spacers has a substantial shape of cuboid with two slots formed in two side surfaces of the back plate spacer respectively.

5. The chair of claim 3, wherein the plurality of back plates are made of aluminum alloy.

6. The chair of claim 3, wherein each of the rear supporting legs has an upper part and a lower part, and the grooves are formed on the upper parts of the rear supporting legs.

7. The chair of claim 6, wherein the upper parts are inclined backward.

8. The chair of claim 3, wherein each of the grooves has a depth which is equal to a thickness of the backrest portion.

9. The chair of claim 3, further comprising two arms assembled between the front supporting legs and the rear supporting legs respectively.

10. The chair of claim 3, wherein each of the two grooves has a shape of substantial hollow cuboid.

11. The chair of claim 1, wherein the fasteners comprise bolts or screws.

12. The chair of claim 1, wherein each of the two grooves has a shape of substantial hollow cuboid.

13. The chair of claim 1, wherein the plurality of back plates are made of aluminum alloy.

14. The chair of claim 1, wherein each of the rear supporting legs has an upper part and a lower part, and the grooves are formed on the upper parts of the rear supporting legs.

15. The chair of claim 14, wherein the upper parts are inclined backward.

16. The chair of claim 1, further comprising two arms assembled between the front supporting legs and the rear supporting legs respectively.

* * * * *